(12) United States Patent
Steuernagel et al.

(10) Patent No.: US 8,132,841 B2
(45) Date of Patent: Mar. 13, 2012

(54) CONVERTIBLE WITH A SUNROOF PART

(75) Inventors: Joerg Steuernagel, Wallenhorst (DE); Marian Dziubiel, Osnabrueck (DE); Morten Goedecke, Osnabrueck (DE); Thomas Oberhoff, Bad Iburg (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 12/676,286

(22) PCT Filed: Sep. 2, 2008

(86) PCT No.: PCT/DE2008/001468
§ 371 (c)(1),
(2), (4) Date: May 18, 2010

(87) PCT Pub. No.: WO2009/030216
PCT Pub. Date: Mar. 12, 2009

(65) Prior Publication Data
US 2010/0225140 A1    Sep. 9, 2010

(30) Foreign Application Priority Data
Sep. 6, 2007 (DE) .......................... 10 2007 042 307

(51) Int. Cl.
*B60J 7/14* (2006.01)
*B60J 7/047* (2006.01)
(52) U.S. Cl. .............. 296/107.01; 296/108; 296/107.08; 296/216.03; 296/216.05

(58) Field of Classification Search ..... 296/216.01–224, 296/107.01–107.2
See application file for complete search history.

(56) References Cited

U.S. PATENT DOCUMENTS

| | | | |
|---|---|---|---|
| 5,558,388 A * | 9/1996 | Furst et al. ................. | 296/107.2 |
| 5,769,483 A * | 6/1998 | Danzl et al. ............... | 296/107.08 |
| 5,975,620 A | 11/1999 | Jambor et al. | |
| 6,398,296 B1 * | 6/2002 | Mayer .......................... | 296/219 |
| 2008/0272626 A1 | 11/2008 | Heselhaus | |

FOREIGN PATENT DOCUMENTS

| | | |
|---|---|---|
| DE | 9108242 U1 | 11/1992 |
| DE | 4326255 C1 | 9/1994 |
| DE | 29715305 U1 | 12/1998 |
| DE | 19737349 A1 | 3/1999 |
| DE | 102005042982 * | 1/2007 |
| EP | 0899142 A2 | 3/1999 |
| FR | 2892066 A1 | 4/2007 |

* cited by examiner

*Primary Examiner* — Dennis Pedder
(74) *Attorney, Agent, or Firm* — Gifford, Krass, Sprinkle, Anderson & Citkowski, P.C.

(57) ABSTRACT

A convertible vehicle has a movable top with a sunroof part that is movable with respect to the surrounding top region. The sunroof part has a closed position and an open position, as well as an interference-preventing position and an intermediate position. The sunroof part is moved to the interference-preventing position during at least part of the movement of the top from the top closed position to the top open position and is moved to the intermediate position when in the top open position.

15 Claims, 17 Drawing Sheets

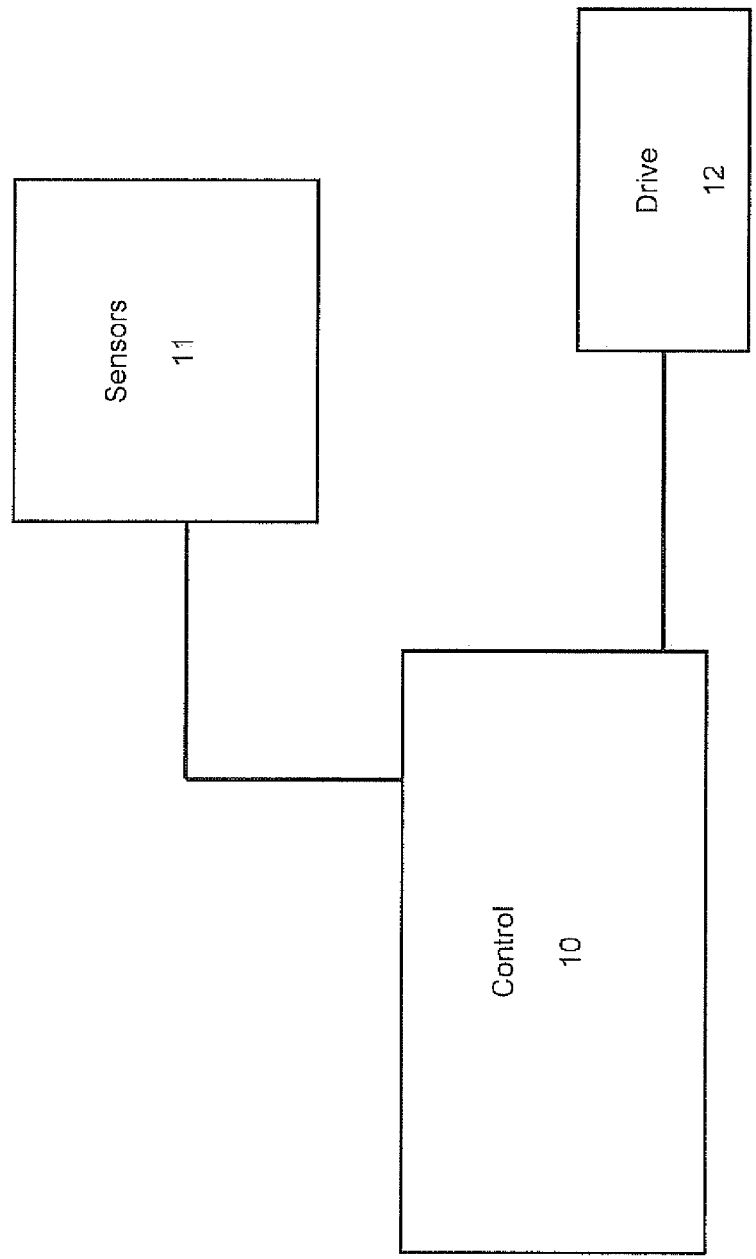

US 8,132,841 B2

CONVERTIBLE WITH A SUNROOF PART

REFERENCE TO RELATED APPLICATIONS

This patent application is the United States national phase application of Patent Cooperation Treaty Application No. PCT/DE2008/001468, filed Sep. 2, 2008, which claims priority from German patent application No. DE 10 2007 042 307.3, filed Sep. 6, 2007, the entire content of both of which are incorporated herein by reference.

FIELD OF THE INVENTION

The present invention relates to a convertible vehicle having at least one top which is movable between closed and open positions and which includes a sunroof part which is movable with respect to a surrounding top region.

BACKGROUND OF THE INVENTION

Convertible vehicles are known in which the top has a sunroof part in its front region. The sunroof part is displaceable to the rear with respect to the surrounding top regions. To open the entire top, the sunroof part is initially opened while the rest of the top remains closed. After the sunroof reaches its completely open position, the top is then moved to an open convertible position. The sunroof part is moved to the rear to make it possible to clear obstacles, for instance of rear headrests, while the top is opening. However, this results in the sunroof part being in a position that is unfavorable for stowage. The opened top has a large longitudinal length. This in particular is true when the sunroof has a relatively large front to back length and/or a very large opening path, which is desirable for a good open-air feeling even with an otherwise closed top.

SUMMARY OF THE INVENTION

The present invention overcomes some of the limitations of the prior art. In an embodiment of the present invention, the sunroof part does not remain in its completely open position with respect to the surrounding top region when the top is in the completely open position. The stowage dimension of the opened top can be reduced in that the sunroof part can automatically be returned into a suitable intermediate position. In addition, the sunroof part in the intermediate position can form a protective cover for top regions disposed thereunder. In particular, the sunroof part can cover a top that is stowed in a so-called Z fold in which a front top region maintains its general orientation, with the outer side facing upwardly, in both the closed and open positions. The stowed top can then be stowed beneath the frontmost top section, which includes the sunroof part, avoiding the need for an outer cover part or tonneau.

The sunroof part can advantageously be moved forwardly in an automated manner up to a rear wall which separates the passenger compartment from the trunk or, depending on the vertical position, up to the rear headrests. This forward movement can also take place during movement of the top so that the actual top opening can take place quickly.

The sunroof part can nevertheless be moved during the top movement in its then completely open position beyond headrests of a rearmost row of seats—which can also be formed by the front seats in a two-seater—without a risk of collision or interference.

Movement of the top is possible both from a closed position of the top with an open sunroof and from a closed position of the top with a closed sunroof or from a closed position with any desired intermediate position of the sunroof. The instantaneous position of the sunroof part is automatically detected so that the user does not need to worry about it and an incorrect operation is precluded. If the sunroof part is already open with top closed, it can be maintained in this position during opening of the top until the risk of collision is eliminated.

For an optimized open-air feeling, the sunroof part forms the middle region of the frontmost end of the movable top with respect to the direction of travel. Thus, the front edge of the stowed top can be displaced by returning the sunroof part into an intermediate position. For example, the sunroof part can be moved toward the rear headrests. Top regions disposed to the side next to the sunroof part can, for example, be stored in a space-saving manner to the sides next to the rear headrests.

BRIEF DESCRIPTION OF THE DRAWINGS

Further advantages and features of the invention result from an embodiment shown schematically in the drawings and described in the following.

FIG. 17 is a block diagram showing a control, a sensor and a drive.

DETAILED DESCRIPTION OF THE INVENTION

Figure 1:
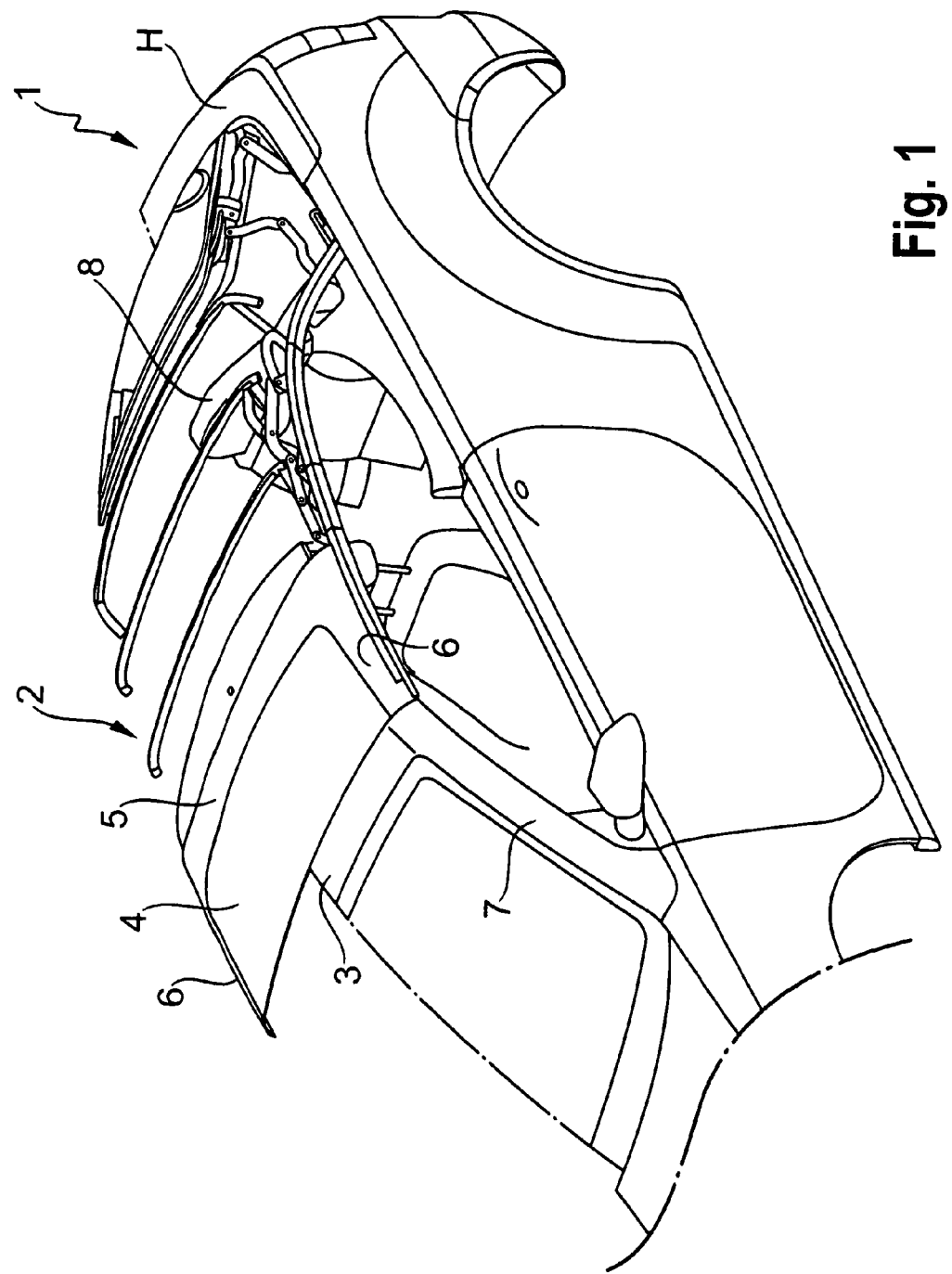
FIG. 1 is a schematic perspective view of a convertible vehicle in accordance with an embodiment of the present invention, shown obliquely from the front with the top closed overall and the sunroof part closed.

The convertible vehicle 1 in accordance with the present invention can—as indicated in the drawing—be a four-seat or multi-seat vehicle provided with at least one rear bench. A two-seater is also possible. In this respect, a vertical rear end can be provided as, for instance, with SUVs, compact vehicles, station wagons or vans. Such a short rear end is promoted by the present invention since the stowed top part package can be disposed relatively far to the front overall and very close to rear headrests, rollbars or the like by movement of the sunroof part in the stowed top position. This avoids the stowed top projecting too far beyond the rear. Alternatively to the short rear end, a notch back or a hatchback is also possible.

The entire top 2 is movable and adjoins a windshield frame 3 directly or indirectly in a closed position. The top may be a retractable hardtop (RHT), which includes a plurality of more or less plate-shaped assemblies with mutually separated outer surfaces. Or, the top may be a soft top with a common flexible covering spanning the top. The top 2 is shown as a soft top, but the actual flexible covering is not shown in the drawing Figures.

The entire movable top 2 can be displaced downwardly when it is opened. A receiving space can be provided to receive the opened top 2. The receiving space may be coverable at least in part by a rear cover H, which may be movable or may remain stationary. The rear cover may provide dual functions. It may at least partial cover the receiving space for the top 2 and may also at least partially cover a baggage space, which may include the receiving space for the top.

The top 2 includes a sunroof part 4 in the front region of the top. The sunroof part is movable with respect to the surrounding top region 5 when the rest of the top is in the closed top position. The opening of only the sunroof part 4 can be seen in the transition from FIG. 1 to FIG. 2. The surrounding top region 5 is of U shape in a plan view. The front edge of the sunroof part 4 in the closed position simultaneously forms the front edge of the top 2 and when the entire top is in the closed position, the front edge of the sunroof part directly adjoins the windshield frame 3. This arrangement is not mandatory. An air deflector or a similar assembly can also be arranged between the sunroof part and the windshield frame, for example.

Figure 2:
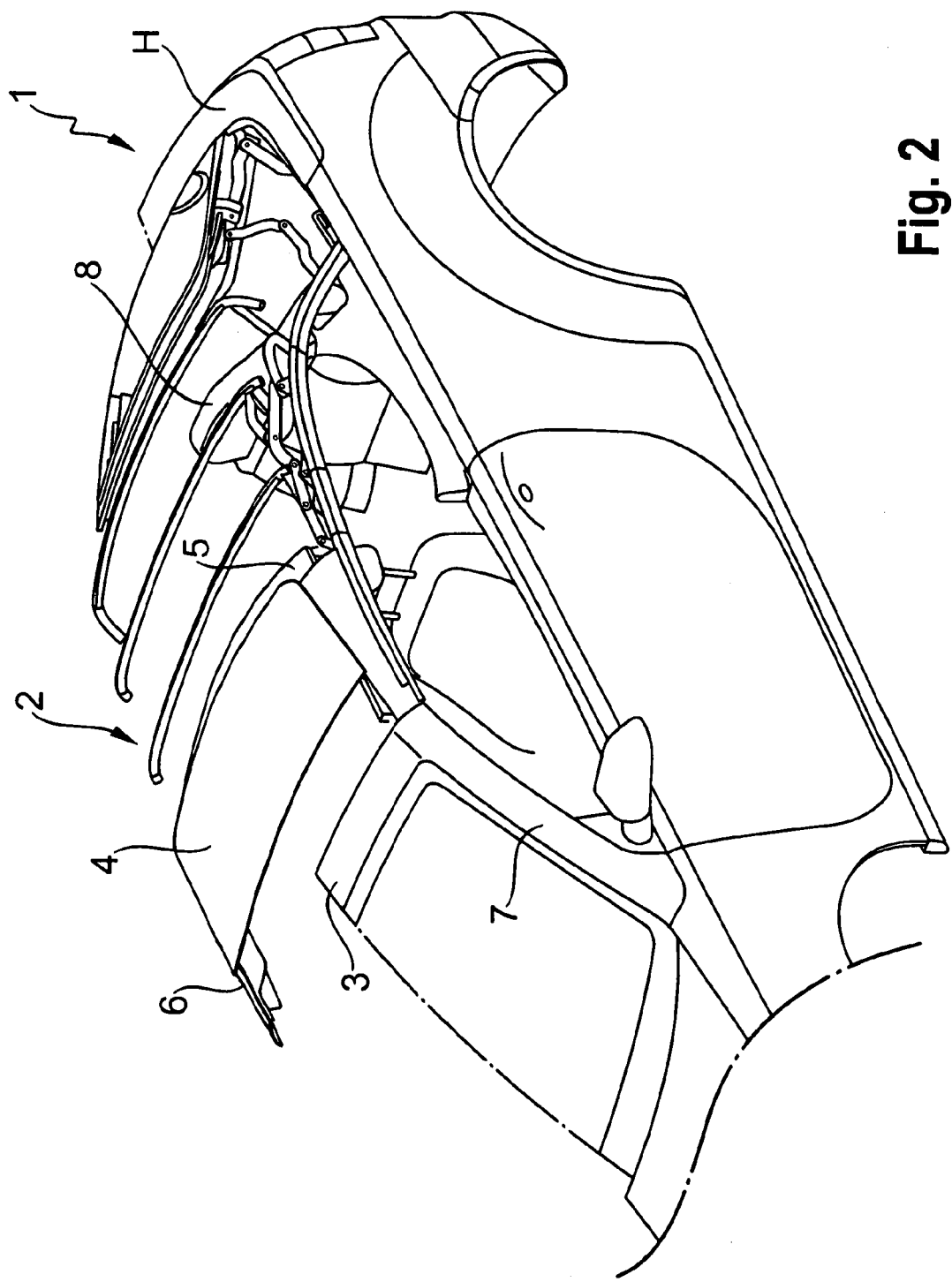
FIG. 2 is a similar view to FIG. 1 with the sunroof part partially open and the top otherwise closed.
Figure 3:
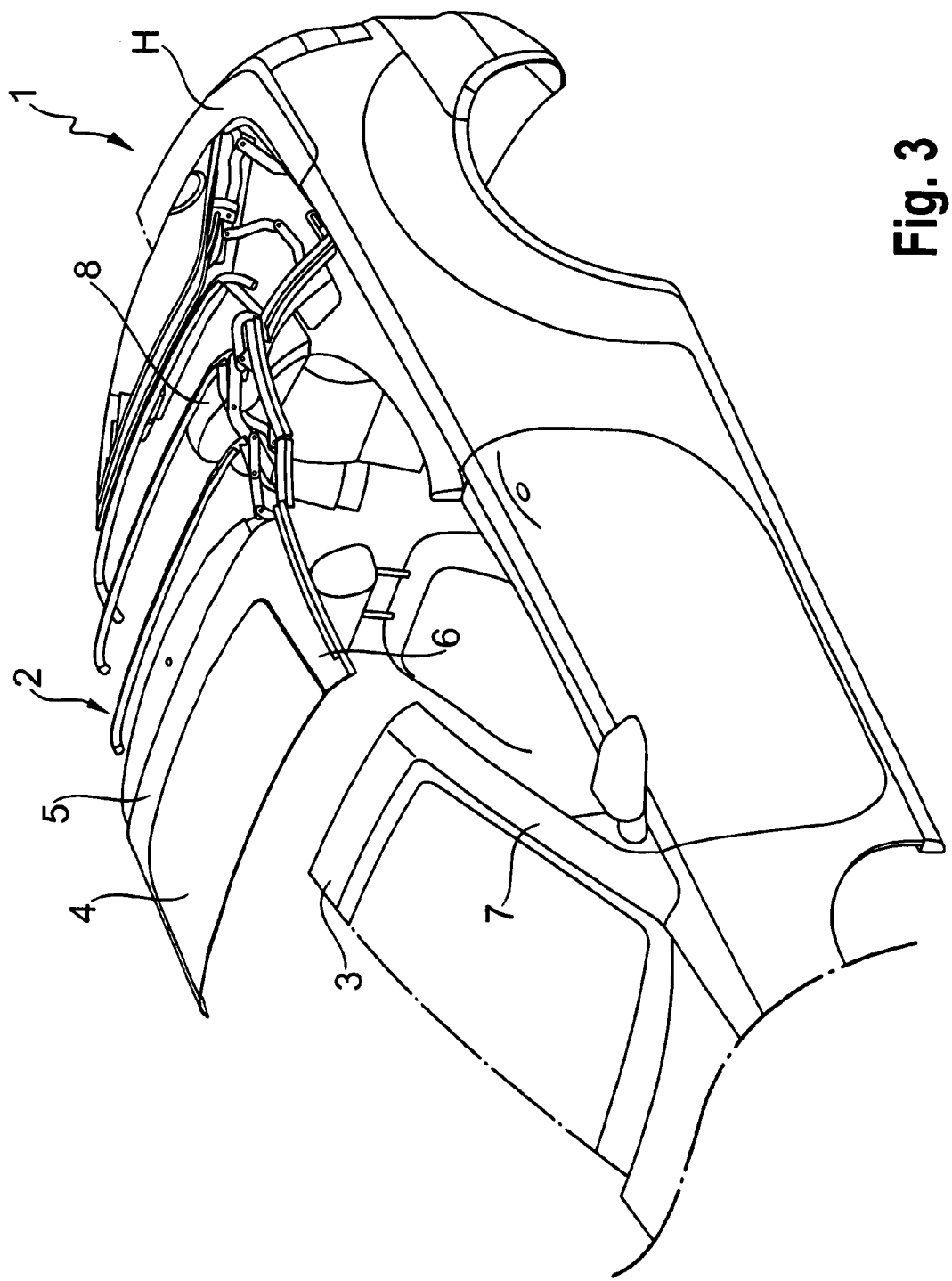
FIG. 3 is a similar view to FIG. 1 with the top starting to open from the closed position shown in FIG. 1 with the sunroof part closed.
Figure 4:
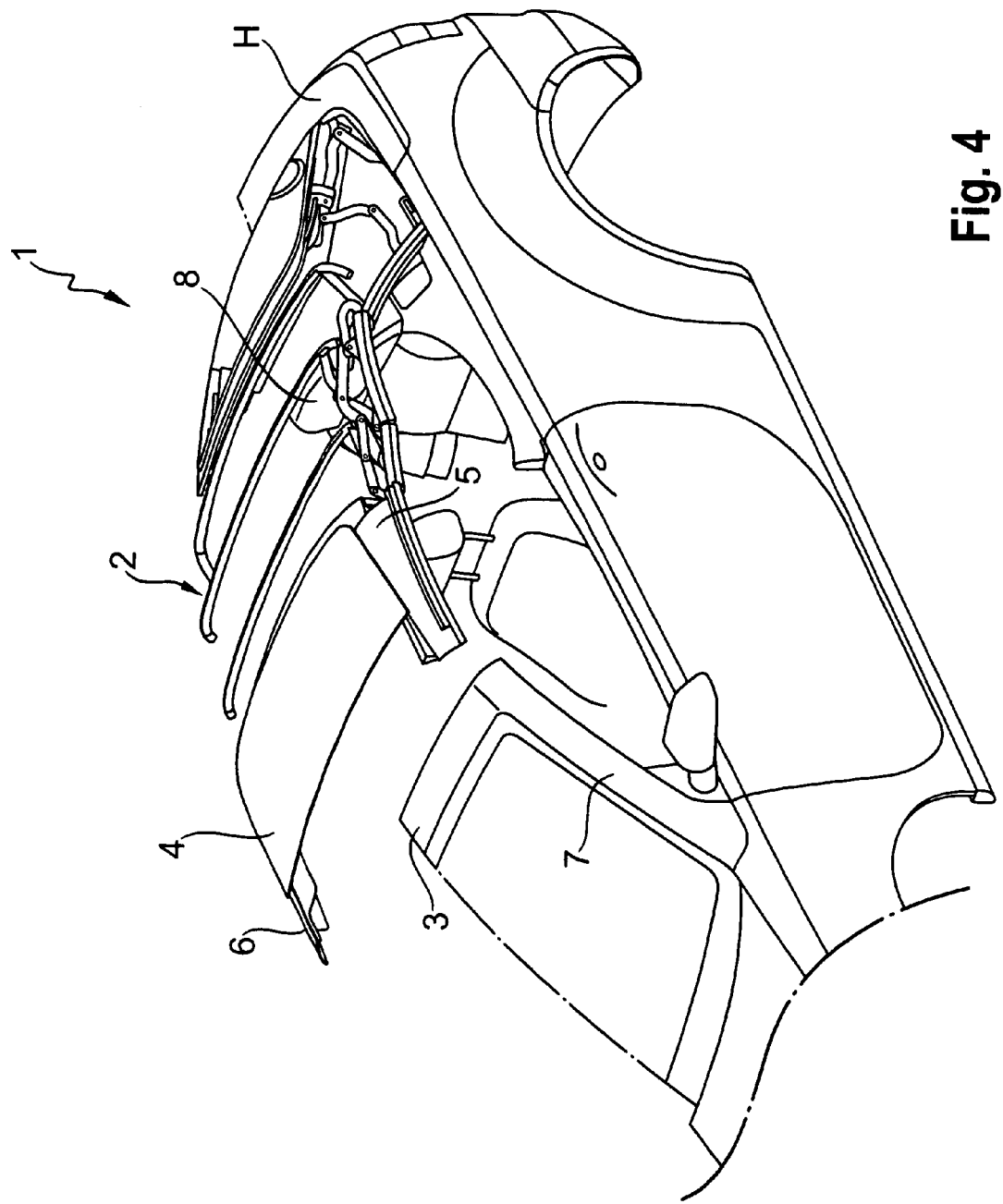
FIG. 4 is a similar view to FIG. 3 with the top starting to open from the closed position shown in FIG. 2 with the sunroof part open.
Figure 5:
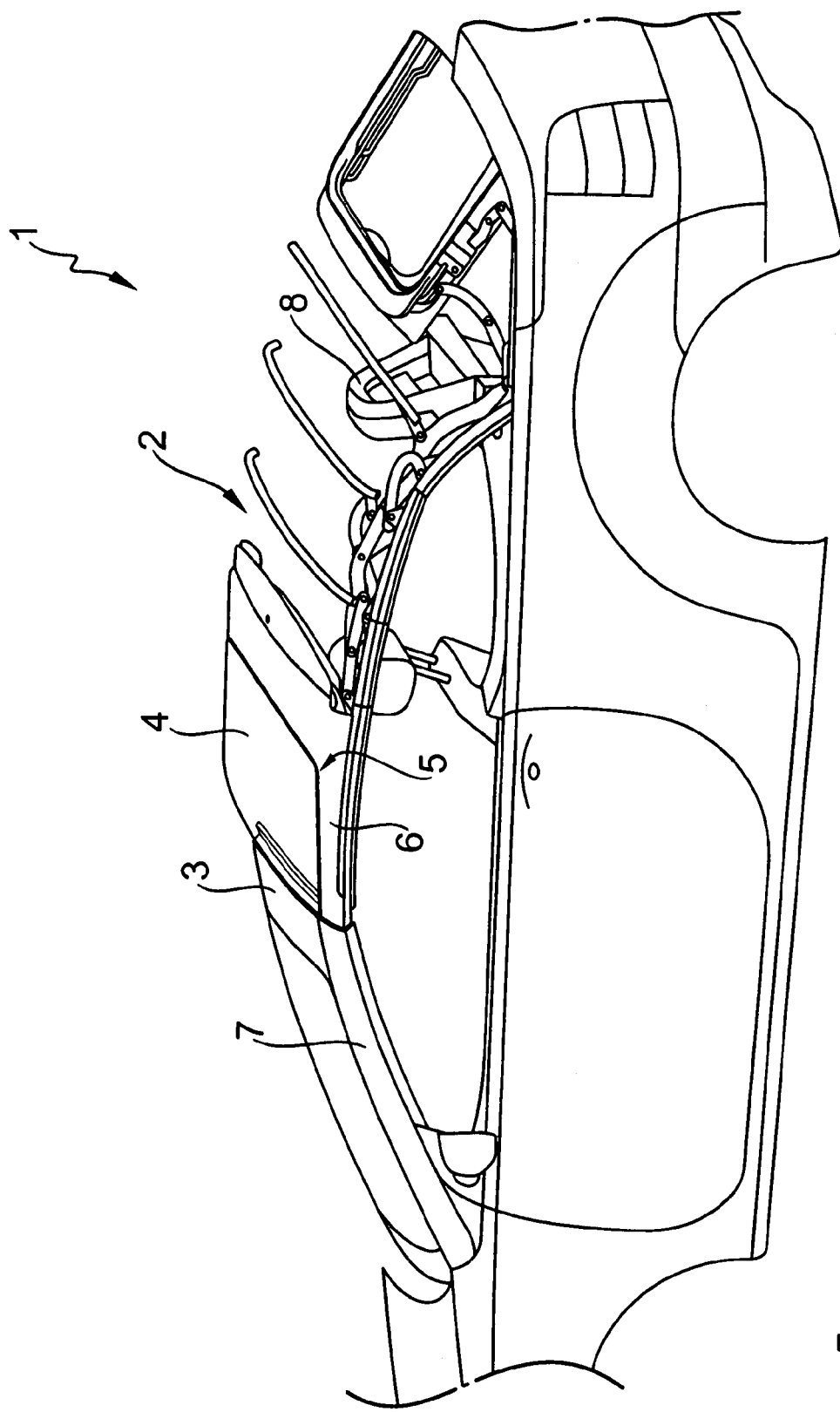
FIG. 5 is a side perspective view, shown obliquely from the rear, of the convertible vehicle of FIG. 1 with the top and the sunroof part closed.
Figure 6:
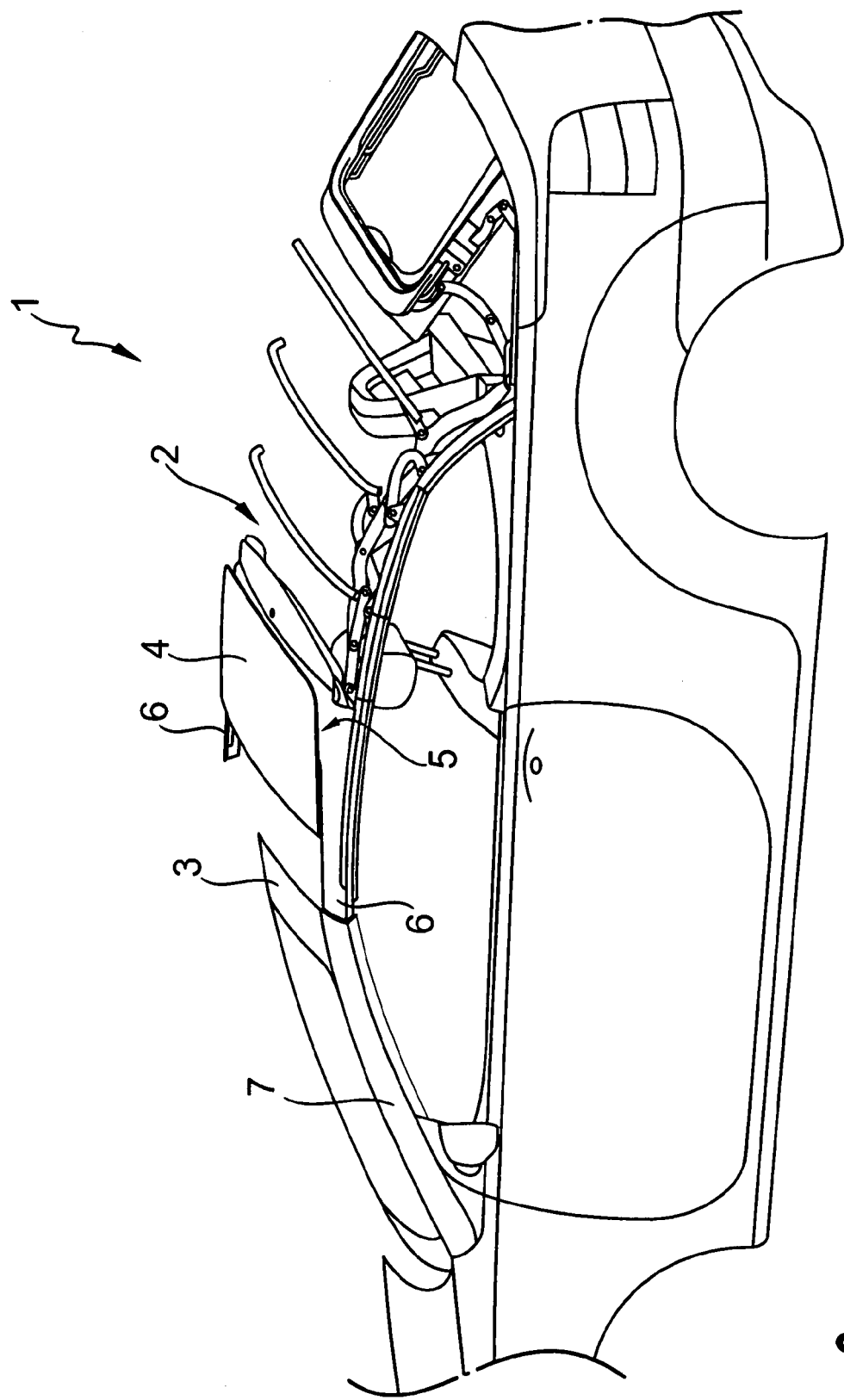
FIG. 6 is a similar view to FIG. 5 with the sunroof part partially open and the top otherwise closed.

In the illustrated U-shaped configuration of the surrounding top region 5, limbs 6 of the top region 5 laterally border the sunroof part 4 when the sunroof part is in the closed position. As shown in FIGS. 1 and 2, when the top is in the closed position, the limbs 6 may be connected to the front lateral pillars 7, or A pillars, or their extensions. This allows the sunroof part 4 to be particularly wide. This design may avoid the need for a crossmember at the front of the top 2, which would otherwise have latching elements to hold the top 2 to the windshield frame 3. As such, the sunroof part 4 can also have a large depth advantageous for a good open-air feeling and feeling of light and can form the frontmost end of the movable top 2 in the middle.

Figure 9:
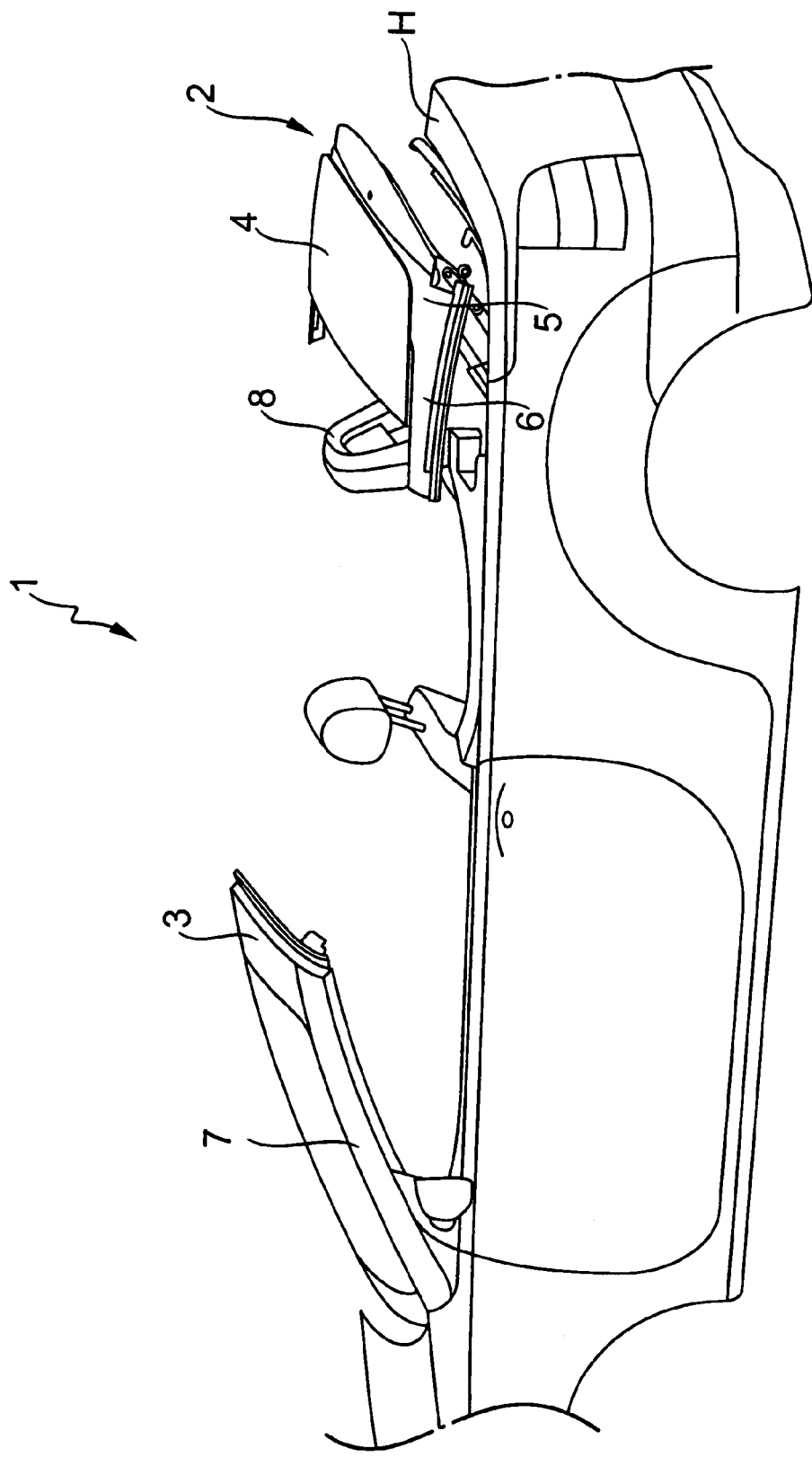
FIG. 9 is a similar view to FIG. 8 with the top opening further, shortly before reaching the stowed top position.
Figure 10:
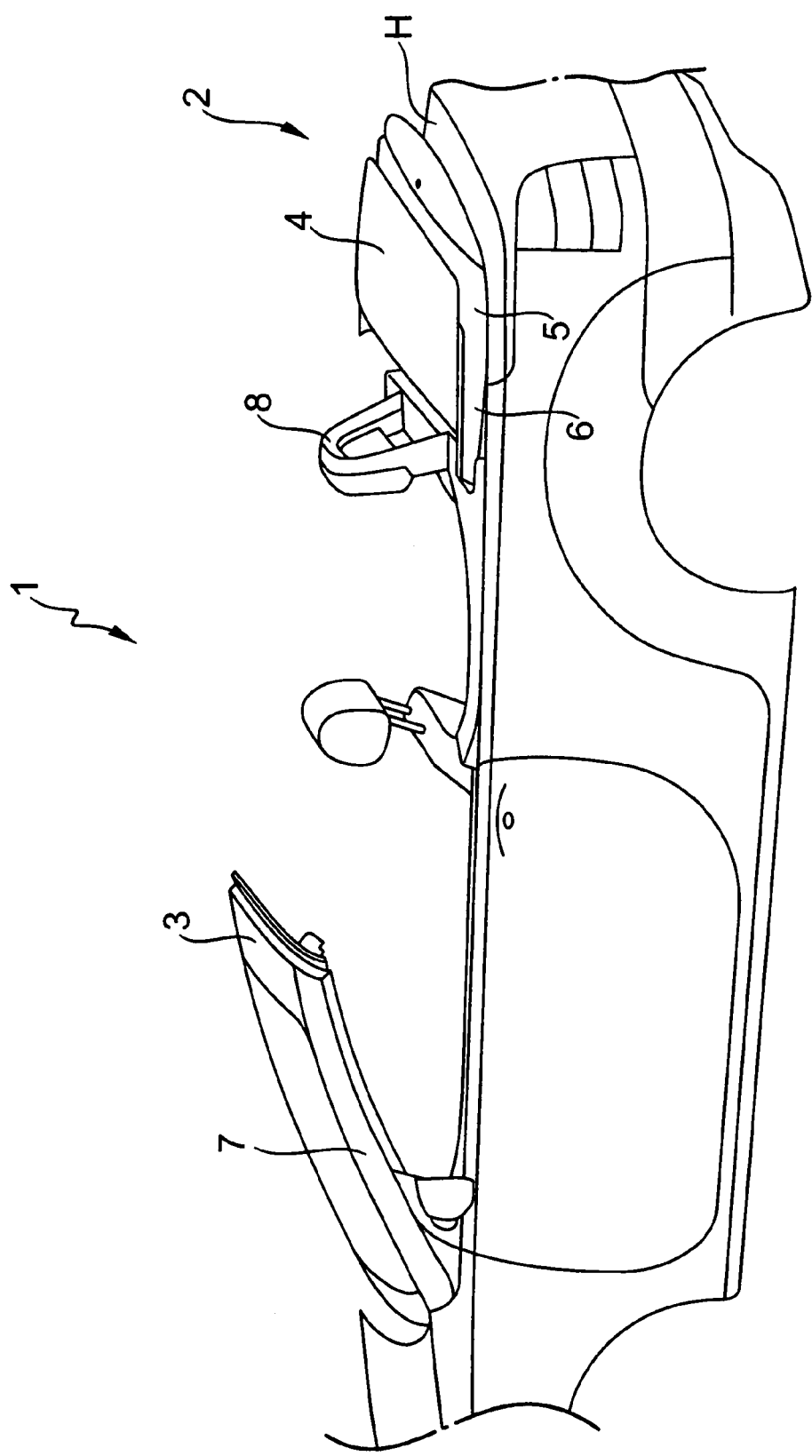
FIG. 10 is a similar view to FIG. 9 with the top in a stowed top position.
Figure 11:
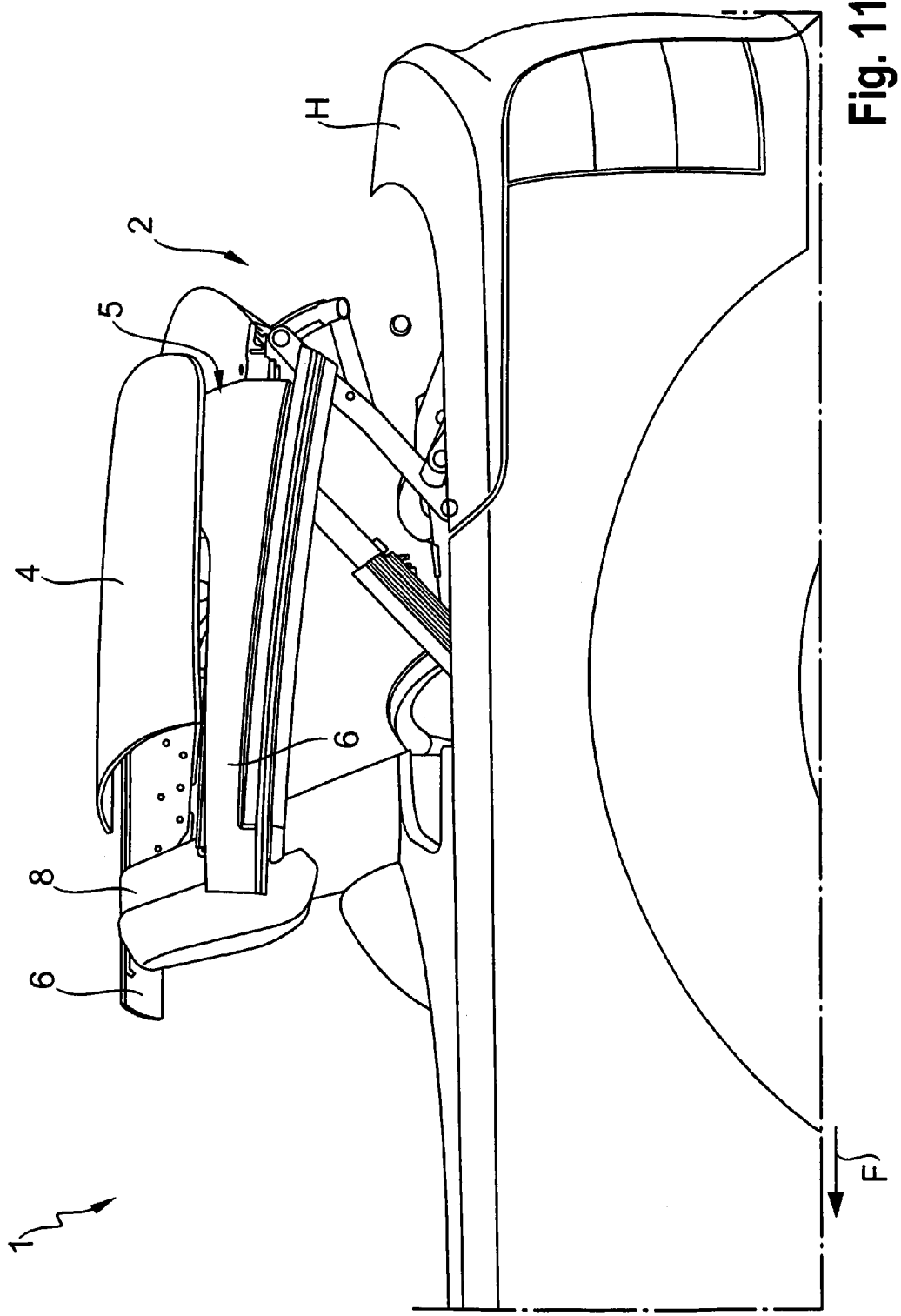
FIG. 11 is a detailed enlargement of the rear vehicle region in a side view during the top opening, approximately corresponding to the top opening position of FIG. 9.

To open the entire top 2 into the convertible position (see, for example, FIG. 12), and to avoid collisions or interference, the sunroof part 4 is disposed to the rear, that is opened, during at least a part of the movement of the top. The sunroof part 4 is, for example, movable beyond the headrests 8 of a rearmost row of seats when in its completely open position (FIG. 9). The limbs 6 can run laterally past these headrests 8 (or also the heads of occupants). The sunroof part 4 is in the middle region of the front of the top, so it is necessary for the sunroof part to be open to avoid a collision during opening of the entire top. Depending on the spatial conditions, the sunroof part does not need to be moved into the rear extreme position, but may be moved to a position that is somewhat further forward. In some embodiments, the sunroof part 4 may be opened rearwardly by at least 20 centimeters with respect to its closed position, so that a good open-air feeling is ensured and also a collision is avoided.

Figure 12:
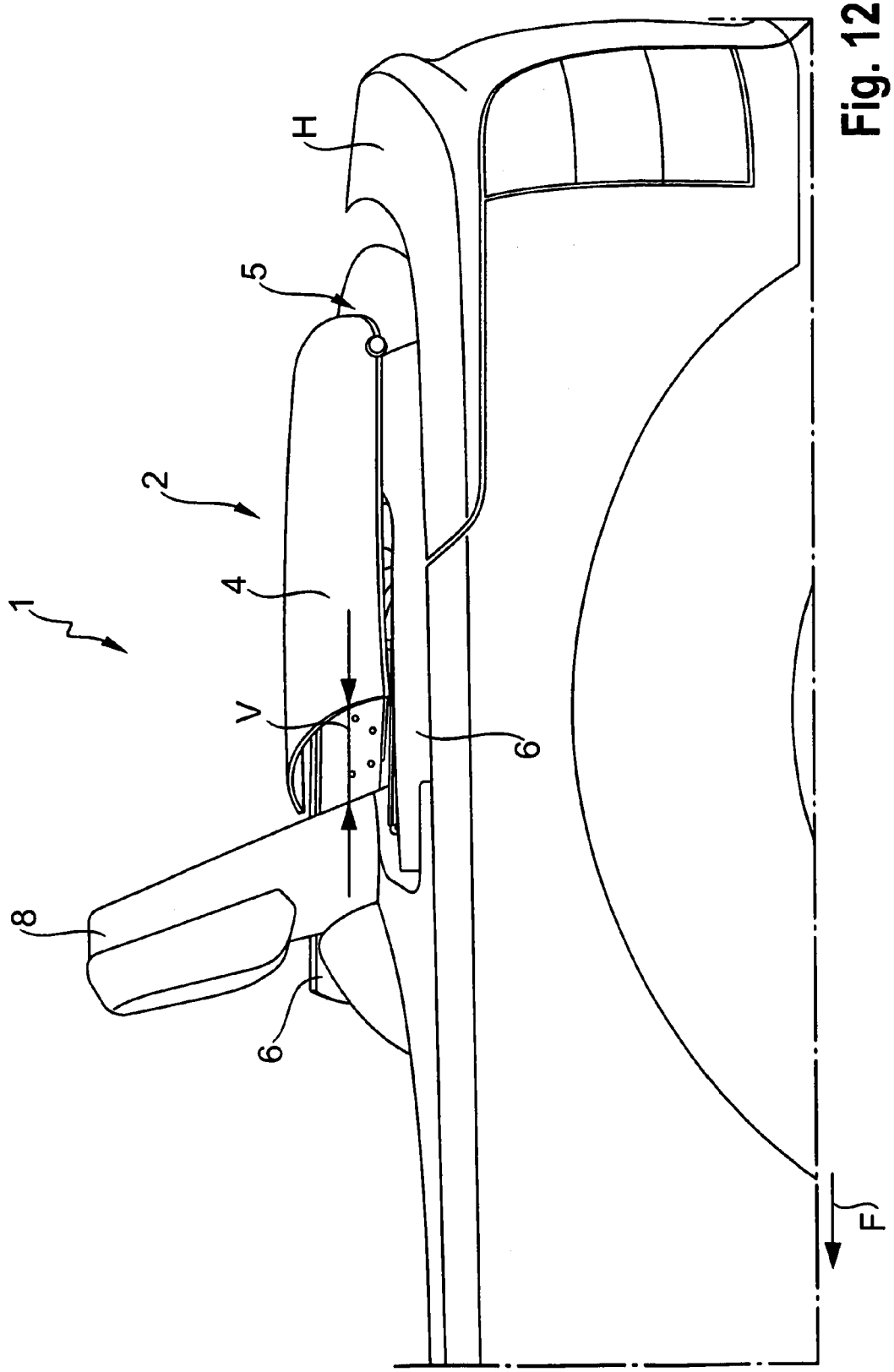
FIG. 12 is a similar view to FIG. 11 in the stowed top position in accordance with FIG. 10.
Figure 15:
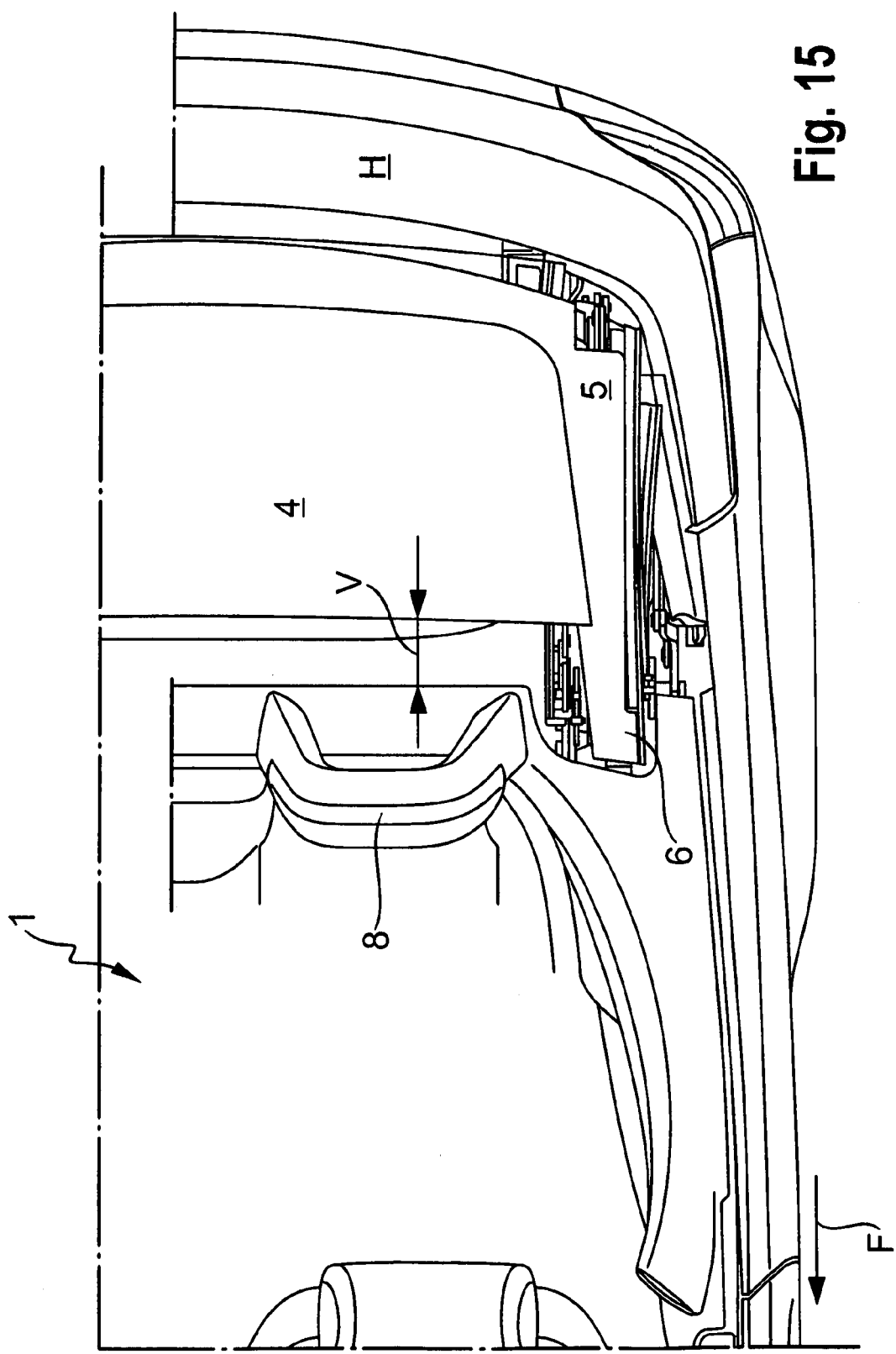
FIG. 15 is a similar view to FIG. 14 with the top in the stowed position of FIG. 12.
Figure 16:
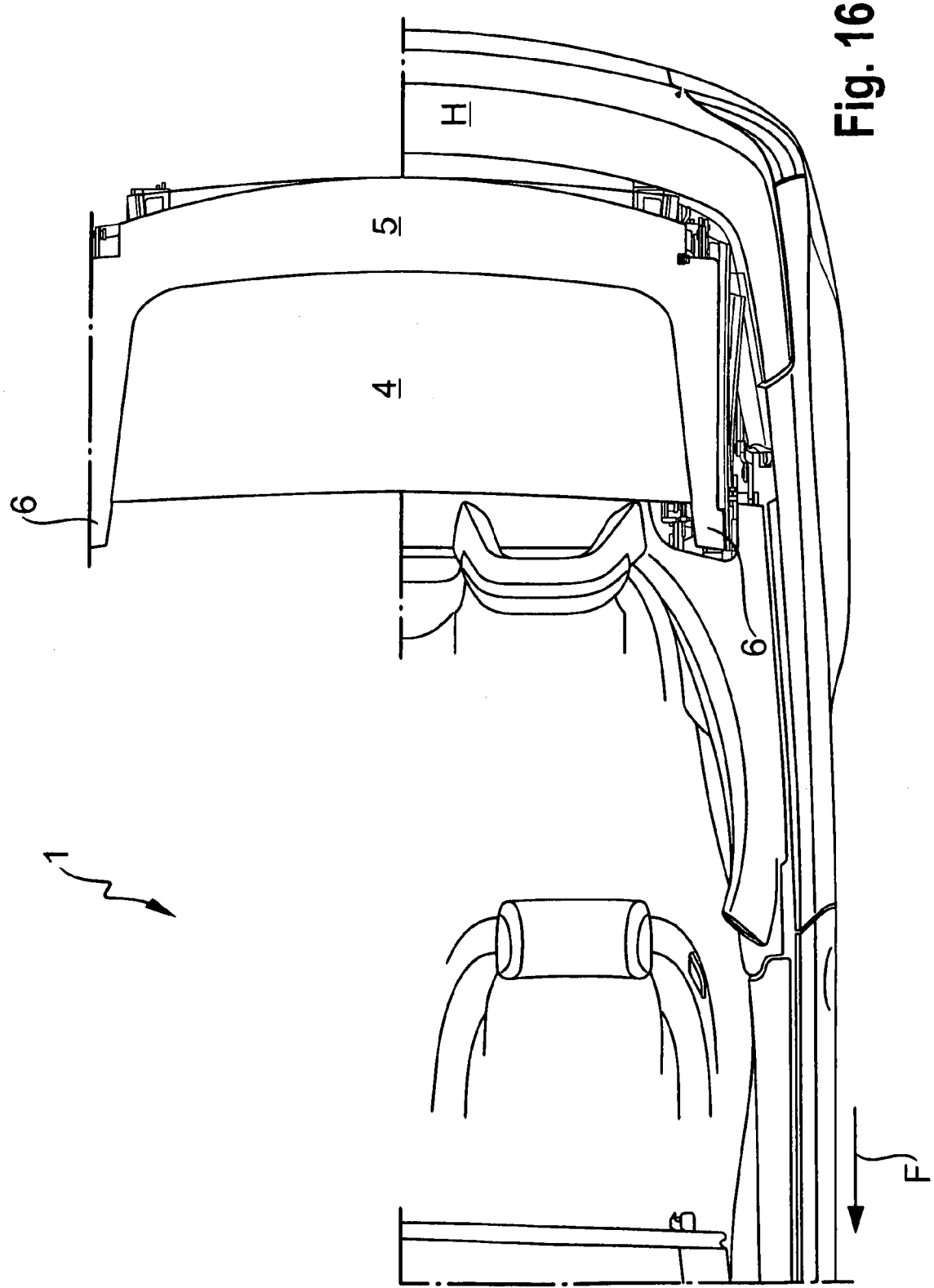
FIG. 16 is a similar view to FIG. 15 with the top in the stowed position of FIG. 13, with the sunroof moved back forwardly.

Once the top is stowed, it is no longer necessary to keep the sunroof part 4 in a collision-avoidance position disposed to the rear (FIG. 12 and FIG. 15). Therefore, the sunroof part 4 can be automatically movable back into an intermediate position displaced further to the front (FIG. 13 and FIG. 16) before the top reaches the completely open position. In other words, the sunroof may be moved in the direction of travel F out of the collision-preventing position, as seen in the transition from FIG. 12 to FIG. 13. The travel path V may amount to some centimeters up to considerably more than ten centimeters—depending on the spatial conditions. It may also be possible to displace the sunroof part 4 completely into its closed starting position when the top is stowed.

Figure 13:
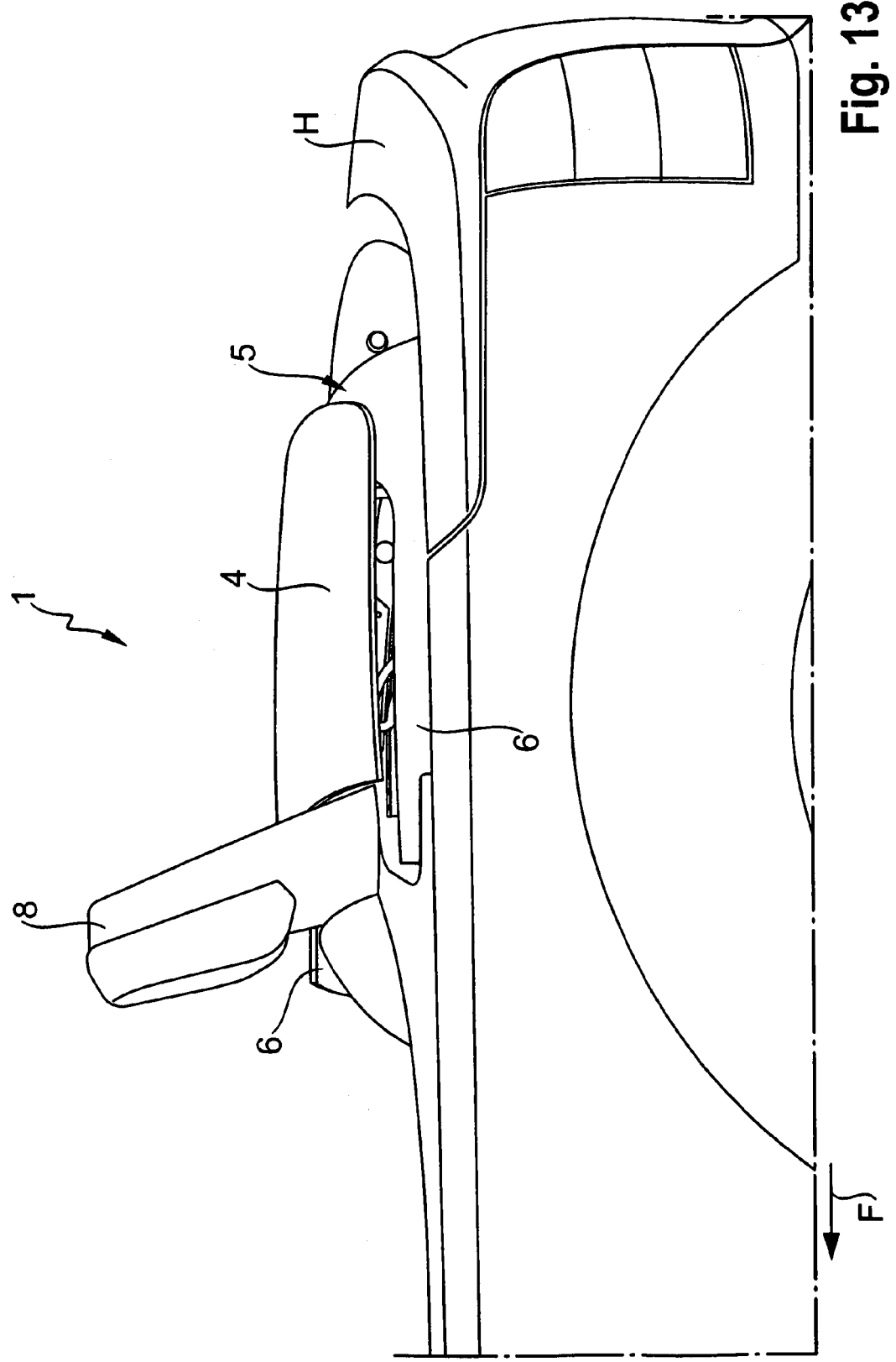
FIG. 13 is a similar view to FIG. 12 with the sunroof part moved back partly to the front into an intermediate position in a stowed top position.
Figure 14:
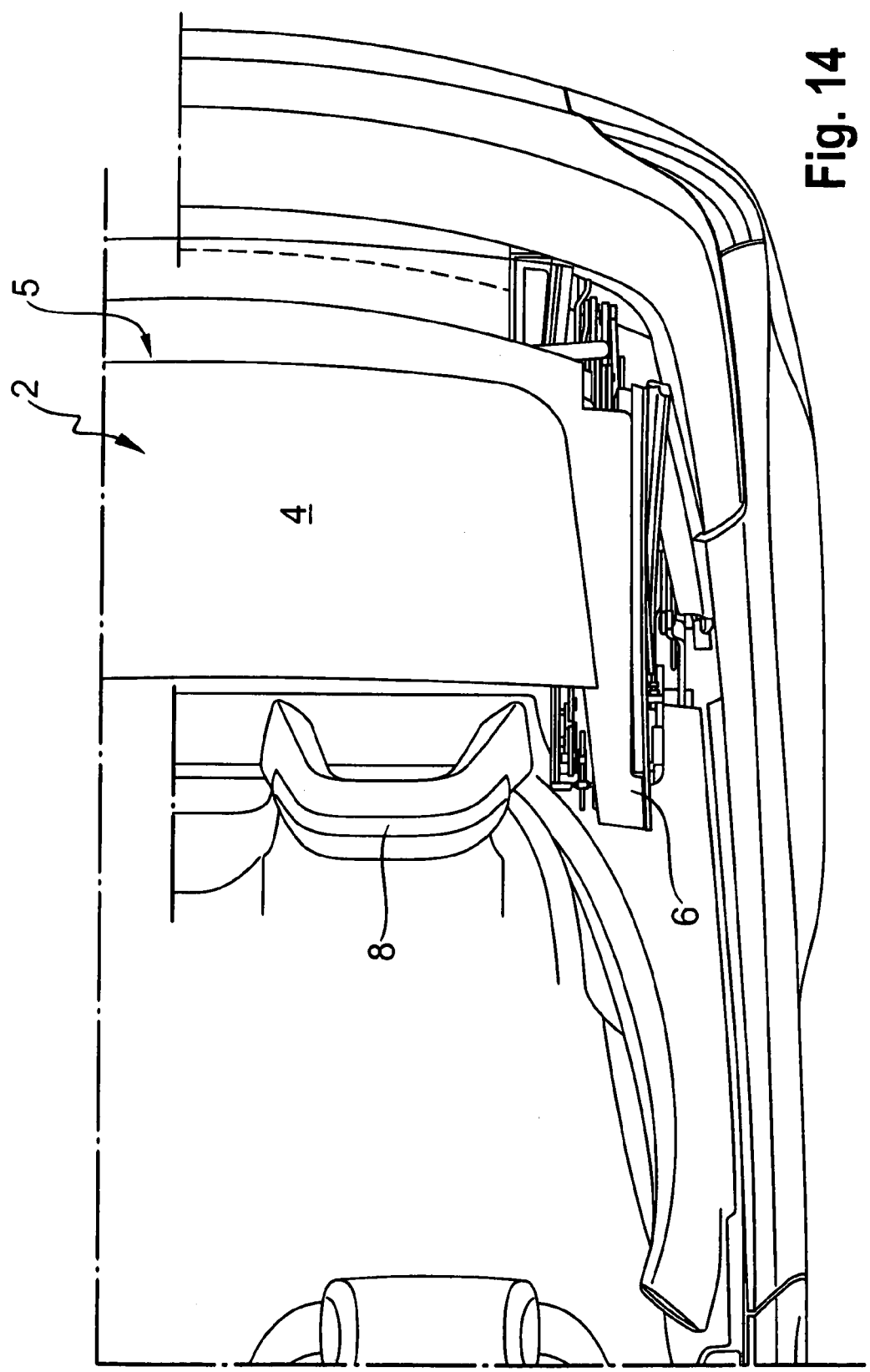
FIG. 14 is a plan view of the vehicle rear with the top in the position of FIG. 11.

As shown in FIG. 13, for example, the sunroof part 4 will reach an end position wherein it directly adjoins the rear headrests and/or rollover protection 8 without a transverse gap remaining between them. A cushioning seal for the front edge of the sunroof part 4 can additionally be provided. The region disposed thereunder can thus be secured against intervention from outside by the sunroof part 4 itself and by the surrounding top region 5 acting as a cover.

The displacement of the sunroof part 4 from its collision-preventing position into an intermediate position when the top is in the completely open position can take place automatically using its own drives. An incorrect operation by the driver is then precluded.

The protective function of the sunroof part 4, with the top stowed, is particularly advantageous when the top 2 is a so-called Z fold design. In this design, the front top region remains in generally the same orientation with the top stowed or closed, with the outer side facing upwardly. The outwardly arched side of the sunroof part 4 then also faces outwardly and covers the top package in the manner of a cover part. The vertical height of the top package can therefore be kept very small.

An external cover for the stowed top part package is not required, but remains possible.

Figure 7:
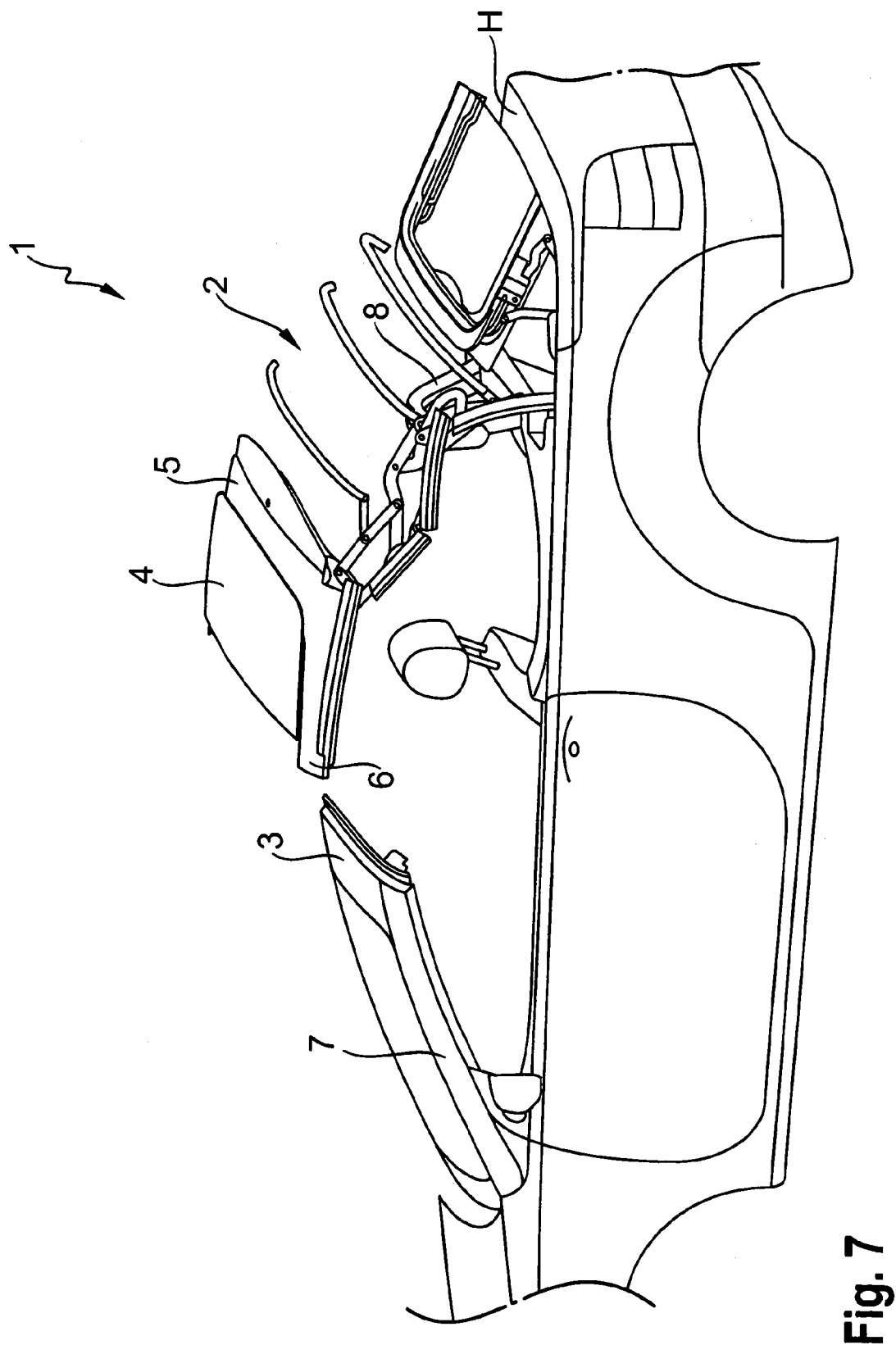
FIG. 7 is a similar view to FIG. 5 during the top opening from the closed position with a closed sunroof part, with the sunroof part being automatically moved towards an open position while the top is opening.
Figure 8:
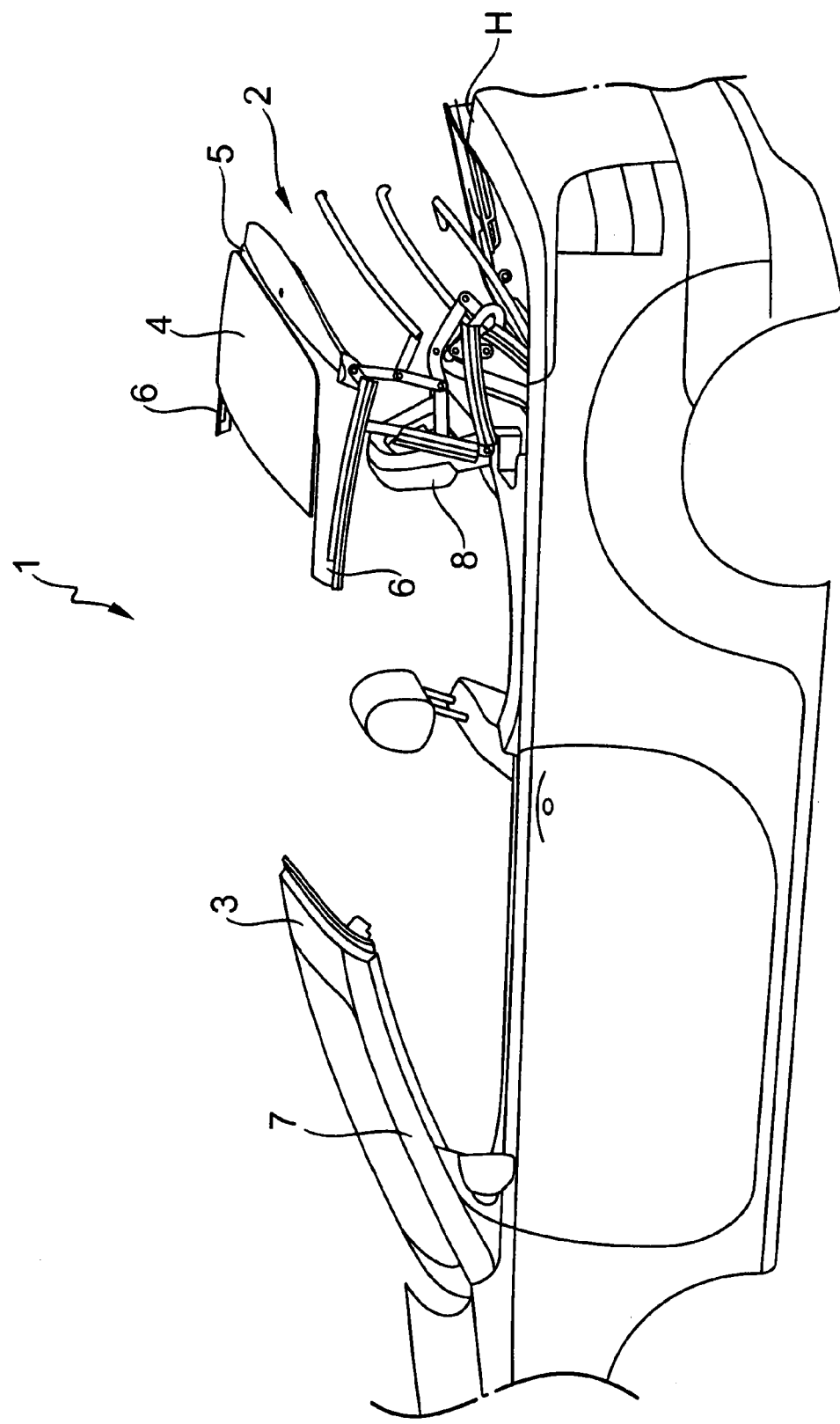
FIG. 8 is a similar view to FIG. 7 with the top opening further.

The top 2 may be moved out of its closed position both from a first closed position with the sunroof part 4 closed (FIG. 1) and from a second closed position with the sunroof part 4 open (FIG. 2). Preferably, it is not necessary to first move the sunroof part 4 out of the position of FIG. 1 while the top is closed. The sunroof part 4 automatically moves into the collision-avoiding position in accordance with FIG. 9 during the opening of the top, as shown in FIGS. 7 to 9. Therefore, the top can be moved from the latching to the windshield frame at an early time or it can move before the start of the sunroof displacement.

In some embodiments, a top may be opened with the sunroof part in any desired intermediate position. The user therefore does not have to worry about the instantaneous condition of the sunroof part 4 when the top is closed. The sunroof part is automatically displaced into the collision-avoiding open position as the top opens. If the sunroof part is already in the collision-avoiding position, with the top closed, the sunroof part may remain in this position. The optionally required displacement of the sunroof part 4 takes place at the same time as the top movement. The opening time of the top 2 may remain the same independently of the respective starting condition of the sunroof part 4.

To control this required movement of the sunroof part 4, which differs depending on the starting situation, an automatic polling of the instantaneous position of the sunroof part 4 is carried out. This may be accomplished, for example, via contactless sensors, potentiometers or end position switches, at the start of the top opening, while the limbs 6 are latched or as the top region 5 starts moving. An electronic control automatically effects the described moving of the sunroof part 4 into its collision-avoiding open position relative to the surrounding top regions 5 or a holding of the sunroof part 4 in this position using these input data during the top opening.

The sunroof part 4 can therefore be exposed to force in different manners during the top movement or can also remain unmoved relative to the surrounding top regions 5. A drive for the displacement of the sunroof part 4 is for this purpose to be controlled independently of a drive for the top movement. In any case, the sunroof part 4 is displaced to the front by the drives by the travel path V at the end of the top opening movement.

In the drawing, the sunroof part 4 can be moved over a top region 5 disposed behind it. Alternatively, with corresponding spatial conditions and sufficient headroom, it would also be possible that it can be moved into a receiving pocket of this top region. It is furthermore possible that the sunroof part 4 is not in one piece, but is rather, for example, designed flexibly in the manner of a rolling top or in the manner of a segmental top with a plurality of transverse elements behind one another. An erection of the sunroof is equally possible; it does not only have to be movable to the rear, but can rather also be able to be positioned obliquely or even vertically upwardly. It is also possible that the sunroof part 4 is only upwardly position able when the top is open. It is first displaced forwardly in this position with the top open in order then to be able to be held upright more or less directly behind the rear headrests 8 as a windstop. Such a displacement can also take place in accordance with the invention independently of the respective sunroof position in the closed position of the top 2.

As will be clear to those of skill in the art, the herein disclosed embodiments of the present invention may be altered without departing from the scope or teaching of the present invention. It is the following claims, including all equivalents, which define the scope of the invention.

The invention claimed is:

1. A convertible vehicle having a vehicle body with a passenger compartment defined therein, the convertible vehicle comprising:
    a movable top having a closed position wherein the top extends over the passenger compartment and an open position wherein the top is stowed;
    the moveable top including a sunroof part that is movable with respect to a surrounding top region, the sunroof part having a closed position and an open position, the sunroof part further having an interference-preventing position and an intermediate position;
    wherein the sunroof part is automatically moved to the interference-preventing position during at least part of the movement of the top from the top closed position to the top open position and is automatically moved to the intermediate position when in the top open position.

2. A convertible vehicle in accordance with claim 1, wherein the sunroof part in the interference-preventing position provides clearance for the top moving past headrests of a rearmost raw of seats.

3. A convertible vehicle in accordance with claim 1, wherein:
    the movable top is a Z fold top having a front top region with an outer surface, the outer surface facing upwardly when the top is in the closed position and when the top is in the open position.

4. A convertible vehicle in accordance with claim 1, wherein:
    the moveable top has a front region including the sunroof part and the surrounding top region; and
    when the top is in the open position, the front region is disposed above a remainder of the top so as to form a cover.

5. A convertible vehicle in accordance with claim 4, wherein the cover formed by the front region of the top is the only cover for the top in the stowed position.

6. A convertible vehicle in accordance with claim 1, wherein:
    the movable top is movable from the closed position with the sunroof part in the sunroof part in an open position or in the closed position.

7. A convertible vehicle in accordance with claim 6, wherein:
    the movable top is also movable from the closed position with the sunroof part in any position between the open and closed positions.

8. A convertible vehicle in accordance with claim 1, wherein:
    if the sunroof part is not in a completely open position when the movable top is moved from the closed position, the sunroof part is moved to the completely open position; and
    if the sunroof part is in a completely open position when the movable top is moved from the closed position, the sunroof part is held in the completely open position.

9. A convertible vehicle in accordance with claim 1, wherein:
    the convertible vehicle further includes sensors for automatic determination of the position of the sunroof part; and
    the sunroof part being automatically moved to a completely open position during movement of the top from the top close position to the top open position.

10. A convertible vehicle in accordance with claim 1, wherein:
    the sunroof part forms the frontmost end of the movable top in the middle with respect to the transverse direction of the vehicle.

11. A convertible vehicle in accordance with claim 10, wherein:
    the surrounding top region is U-shaped with a limb disposed on each side of the sunroof part when the sunroof part is in the closed position.

12. A convertible vehicle in accordance with claim 1, wherein:
    the sunroof portion in the interference-preventing position is disposed rearwardly by at least 20 centimeters with respect to the closed position of the sunroof part.

13. A convertible vehicle in accordance with claim 12, wherein:
    the sunroof part in the interference-preventing position is disposed in the open position of the sunroof part.

14. A convertible vehicle in accordance with claim 1, wherein:
    the sunroof part is held in the interference-preventing position so as to clear a rear structure of the vehicle during at least part of the movement of the top from the top closed position to the top open position.

15. A convertible vehicle in accordance with claim 1, further comprising:

a control operable to automatically move the sunroof part to the interference-preventing position during at least part of the movement of the top from the top closed to the top open position and to automatically move the sunroof part to the intermediate position when the top is in the top open position.

* * * * *

UNITED STATES PATENT AND TRADEMARK OFFICE
CERTIFICATE OF CORRECTION

PATENT NO.        : 8,132,841 B2
APPLICATION NO.   : 12/676286
DATED             : March 13, 2012
INVENTOR(S)       : Joerg Steurnagel et al.

It is certified that error appears in the above-identified patent and that said Letters Patent is hereby corrected as shown below:

Col. 3, line 31: replace "partial" with --partially--
Col. 5, line 35: replace "position able" with --positionable--
Col. 5, line 67: replace "raw" with --row--
Col. 6, line 21: delete "in the sunroof part"
Col. 8, line 1: replace "closed to" with --closed position to--

Signed and Sealed this
Fifth Day of June, 2012

David J. Kappos
*Director of the United States Patent and Trademark Office*